United States Patent
Kramer et al.

(10) Patent No.: US 9,575,994 B2
(45) Date of Patent: Feb. 21, 2017

(54) METHODS AND DEVICES FOR DATA RETRIEVAL

(75) Inventors: Martin Kramer, Erlangen (DE); Marisa Petri, München (DE); Sascha Seifert, Erlangen (DE)

(73) Assignees: Siemens Aktiengesellschaft, Munich (DE); Ludwig-Maxmilians-Universitat, Munich (DE)

( * ) Notice: Subject to any disclaimer, the term of this patent is extended or adjusted under 35 U.S.C. 154(b) by 1195 days.

(21) Appl. No.: 13/370,363

(22) Filed: Feb. 10, 2012

(65) Prior Publication Data

US 2012/0209833 A1 Aug. 16, 2012
US 2013/0036111 A2 Feb. 7, 2013

(30) Foreign Application Priority Data

Feb. 11, 2011 (EP) ..................... 11154185

(51) Int. Cl.
*G06F 17/30* (2006.01)

(52) U.S. Cl.
CPC ... *G06F 17/30247* (2013.01); *G06F 17/30265* (2013.01); *G06F 17/30277* (2013.01)

(58) Field of Classification Search
None
See application file for complete search history.

(56) References Cited

U.S. PATENT DOCUMENTS

2003/0195883 A1* 10/2003 Mojsilovic et al. ............... 707/6
2005/0251013 A1* 11/2005 Krishnan et al. ............ 600/407
2006/0147099 A1* 7/2006 Marshall et al. ............. 382/128
2006/0274928 A1* 12/2006 Collins et al. ................ 382/132
2007/0011175 A1* 1/2007 Langseth et al. ............ 707/100
2007/0025606 A1* 2/2007 Gholap et al. ............... 382/128
2007/0067345 A1* 3/2007 Li et al. ..................... 707/104.1
2007/0094253 A1* 4/2007 Bent ................................ 707/5
2007/0118399 A1* 5/2007 Avinash et al. .................. 705/2
2009/0287680 A1* 11/2009 Paek et al. ........................ 707/5

(Continued)

OTHER PUBLICATIONS

S. Seifert et al., "Hierachical Parsing and Semantic Navigation of Full Body CT Data", Proceedings of the SPIE, vol. 7259, pp. 725902-725910 (2009); Others; 2009.

(Continued)

*Primary Examiner* — Hung Q Pham
(74) *Attorney, Agent, or Firm* — Harness, Dickey & Pierce, P.L.C.

(57) ABSTRACT

Methods and device are disclosed for data retrieval. At first images and reports are analyzed by respective parser units to detect both structures and text passages that are related to respective structures and text passages of a knowledge data-base. The detected structures and text passages are stored together with a unique resource located that identifies the respective structure and/or text passage at the knowledge database in a semantic annotation database. In addition a feature extraction can be performed to provide specific features of the images and/or regions of the images, whereby the features are stored in an image feature database. Finally an input query can ask questions that are used to provide a result to the query based on the semantic annotation database and the image feature database. The methods and devices may be used for data preparation and data retrieval of medical images and associated medical reports.

20 Claims, 5 Drawing Sheets

(56) References Cited

U.S. PATENT DOCUMENTS

2009/0290778 A1*  11/2009  Sun et al. ............... 382/131
2010/0174704 A1*  7/2010   Ciravegna et al. ........ 707/722
2010/0232661 A1*  9/2010   Hisanaga et al. ......... 382/128
2011/0093293 A1*  4/2011   G. N. et al. ............. 705/3
2012/0130734 A1*  5/2012   White .................... 705/2
2012/0158739 A1*  6/2012   Ah-Pine et al. .......... 707/748

OTHER PUBLICATIONS

Seifert, S.; Kelm, M.; Moeller, M.; Mukherjee, S.; Cavallaro, A.; Huber, M. & Comaniciu, D. (2010), Semantic Annotation of Medical Images, In 'SPIE 2010 Medical Imaging'; Book.

Feulner, J.; Zhou, S. K.; Huber, M.; Hornegger, J.; Comaniciu, D. & Cavallaro, A. (2010), Lymph Node Detection in 3-D Chest CT using a Spatial Prior Probability, in 'CVPR 2010: IEEE Conference on Computer Vision and Pattern Recognition'.; Book.

Priority Document for European Application No. EP 11154185 (Not Yet Published).

\* cited by examiner

METHODS AND DEVICES FOR DATA RETRIEVAL

PRIORITY STATEMENT

The present application hereby claims priority under 35 U.S.C. §119 to European patent application number EP 11154185 filed Feb. 11, 2011, the entire contents of which are hereby incorporated herein by reference.

FIELD

At least one embodiment of the invention generally relates to methods and devices for data retrieval.

BACKGROUND

Diagnosis and treatment planning for patients can be significantly improved by comparing the patient's images with clinical images of other patients with similar anatomical and pathological characteristics, where the similarity is based on the understanding of the image content. There are two kinds of search: semantic search in patient records (=structured data) and similarity search on images using low-level image features.

The first requires semantically annotated images (i.e., labeled image regions) using a common vocabulary from a knowledge databases. This structured information is stored side-by-side with the images. For storing semantic information and background knowledge one often uses ontologies. The second search type uses similarity metrics based on pixel intensities.

With these two query methods the user can search the content of images, texts and other clinical values acquired at the hospital for similar medical cases.

Current systems show weak search capabilities. Therefore the user must remember a similar medical case and search by the patient's name.

SUMMARY

The inventors have discovered that presently there are no methods or devices available that enables combined use of two queries.

Hence, at least one embodiment of the invention is directed to providing methods and/or devices that enable combined use of queries based on semantic search in structured data and image similarity search comparing visual structures, such as pixel intensities.

Extensions and alternative solutions are described by the dependent claims.

At least one embodiment of the invention relates to a method for data retrieval of a final result list, comprising:
  Analyzing at least one image to detect structures;
  Mapping the detected structures to unique resource identifiers coming from knowledge database;
  Storing the detected structures and the unique resource identifiers as a first semantic annotation;
  Analyzing at least one report to identify a content of a text passage;
  Mapping the detected text passage to unique resource identifiers coming from the knowledge database;
  Storing a begin and an end of the detected text passage and the unique resource identifiers as a second semantic annotation;
  Analyzing at the least one image to compute at least one feature;
  Storing the at least one computed features and an index for fast retrieval;
  Proving an input query describing a search to be executed;
  Forming a first query based on the input query and on additional anatomic information provided by the knowledge database;
  Generating a first result list providing search results of the first query based on the semantic annotations;
  Forming a second query based on the input query and at least one computed feature based on the input query;
  Generating a second result list providing search results of the second query based on the at least one stored computed feature;
  Aggregating the first result list and the second result list to form a final result list that provides reference to the at least one image and/or to an image region of the at least one image.

At least one embodiment of the invention relates to a device for data retrieval of a final result list, comprising:
  Analyzing at least one image stored on an image database to detect structures by an image parser unit;
  Mapping the detected structures by the image parser unit to unique resource identifiers coming from a knowledge database;
  Storing the detected structures and the unique resource identifiers as a first semantic annotation in a semantic annotation database by the image parser unit;
  Analyzing at least one report that is stored in a report database to identify a content of a text passage by a text parser unit;
  Mapping the detected text passage by the text parser unit to unique resource identifiers coming from the knowledge database;
  Storing a begin and an end of the detected text passage and the unique resource identifiers as a second semantic annotation in the semantic annotation database by the text parser unit;
  Analyzing at the least one image to compute at least one feature by a feature extractor unit;
  Storing the at least one computed features and an index for fast retrieval in the image feature database by a indexing unit;
  Proving an input query describing a search to be executed;
  Forming a first query based on the input query and on additional anatomic information provided by the knowledge database by a query engine unit and a semantic inference unit;
  Generating a first result list providing search results of the first query based on the semantic annotations by the semantic inference unit;
  Forming a second query based on the input query and at least one computed feature based on the input query by the query engine unit and the indexing unit;
  Generating a second result list providing search results of the second query based on the at least one stored computed feature by the indexing unit;
  Aggregating the first result list and the second result list to form a final result list that provides reference to the at least one image and/or to an image region of the at least one image by the query engine unit.

BRIEF DESCRIPTION OF THE DRAWINGS

In the following detailed description, example embodiments not to be understood in a limiting sense together with their features and further advantages will be described with reference to the accompanying drawings in which.

The invention is described by the aid of the following figures.

Figure 1:
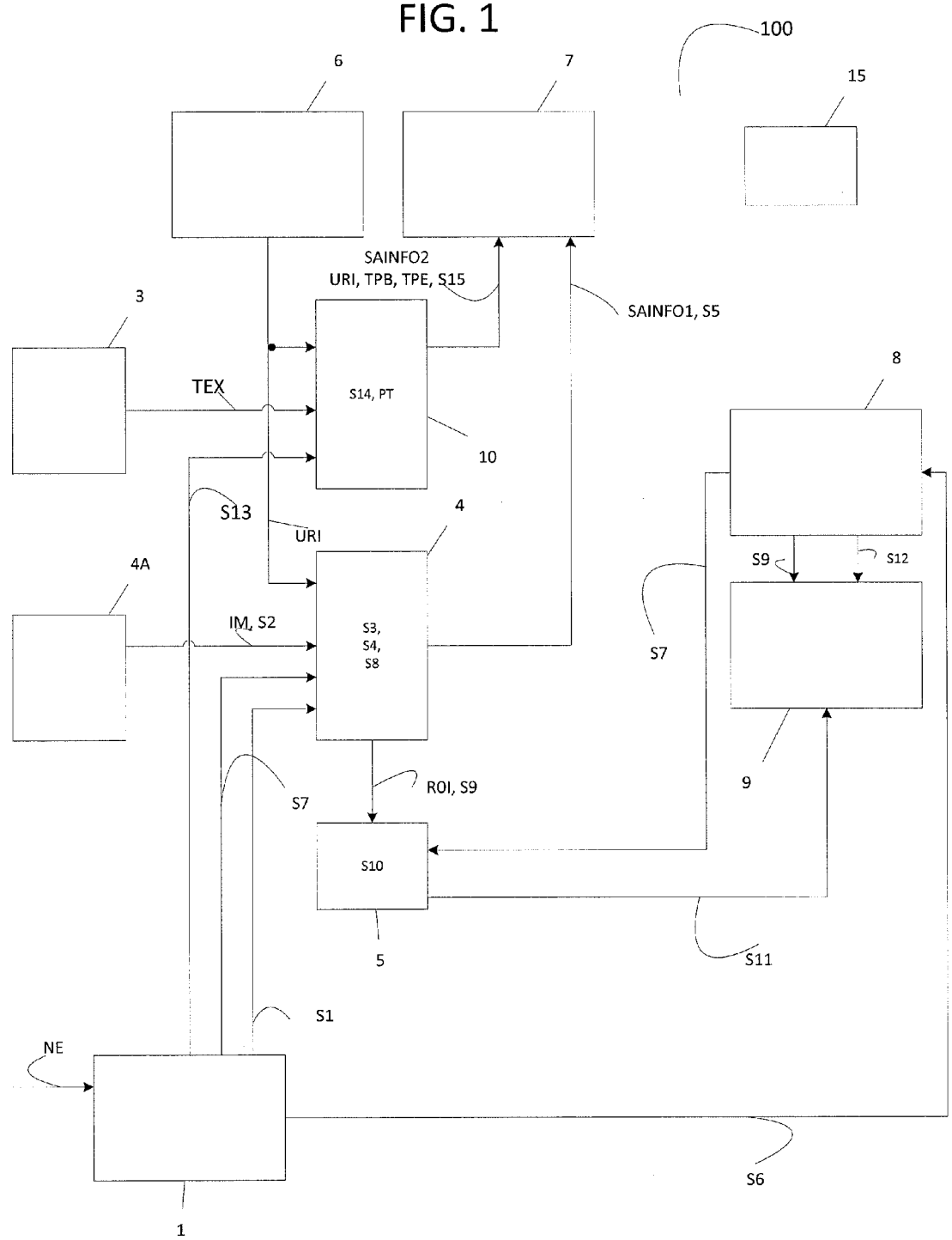
FIG. 1: Method steps and units of a device for realizing a data preparation phase.

Elements that show identical functions and effects are labeled by the same reference signs.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION OF THE EXAMPLE EMBODIMENTS

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed below, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks will be stored in a machine or computer readable medium such as a storage medium or non-transitory computer readable medium. A processor(s) will perform the necessary tasks.

Specific structural and functional details disclosed herein are merely representative for purposes of describing example embodiments of the present invention. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments may be described with reference to acts and symbolic representations of operations (e.g., in the form of flowcharts) that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs) computers or the like.

Note also that the software implemented aspects of the example embodiments may be typically encoded on some form of program storage medium or implemented over some type of transmission medium. The program storage medium (e.g., non-transitory storage medium) may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

At least one embodiment of the invention generally relates to methods and devices for data retrieval. At first images and reports are analyzed by respective parser units to detect both structures and text passages that are related to respective structures and text passages of a knowledge database. The detected structures and text passages are stored together with a unique resource located that identifies the respective structure and/or text passage at the knowledge database in a semantic annotation database. In addition a feature extraction can be performed to provide specific features of the images and/or regions of the images, whereby the features are stored in an image feature database. Finally an input query can ask visual and textual questions that are used to provide a result to the query based on the semantic annotation database and the image feature database. The methods and devices may be used for data preparation and data retrieval of medical images and associated medical reports.

In the following a term system is equivalent to the method or an associated device executing the method.

Various embodiments of the invention show at least one one of several advantages:
More flexibility in query formulation; the system accepts text and image data;
Constraining image similarity search, which is available in some content-based image retrieval systems, with semantic knowledge;
Combined search returns better match of search results than querying separately;
The semantic search can be expanded using background knowledge about anatomy and pathology, e.g., the system can deal with synonyms and hyperonyms.
The system enables to search for similar medical cases (e.g., the same disease stage) since the system can deal with text, images and clinical values.

The respective text reports describe a content of the respective images. The reports are often generated by clinical staff to describe the respective images for documentation purpose.

In an embodiment of the invention, the detection of structures in the at least one image includes segmenting anatomy and pathological structures. Herewith at least one embodiment of the invention can be used for improving the quality of diagnosis in the healthcare sector.

If the previous embodiment uses software detectors to perform the detection a cost effective and flexible realization of the detection is provided.

In another embodiment of the invention the mapping of the detected structure includes
a comparison of known structures of the knowledge database with the detected structure,
a selection of one of the known structures that shows the highest similarity to the detected structure compared to the other known structures,
assigning the unique resource identifier of the selected known structure to the detected structure.

Hereby a quality of detecting structures based on known structures or similar structures stored in the knowledge database can be achieved.

In another embodiment, the storing of the detected structure includes a storage of a reference information to the at least one image that is stored on an image database. Hereby storage space in the semantic annotation database can be reduced, because the reference information requires less storage space than the entire image or a part of the image.

Further to the previous embodiment, the storing of the detected structure includes a storage of a bounding box that defines a region of interest in the at least one image, whereby the region of interest represents an image area that covers the detected structure. By using the bounding box a location of a relevant structure can be described in a more precise way compared to the case when a reference relates to an entire image.

In another embodiment of the invention, the mapping of the detected text passage includes
- a comparison of known text passages of the knowledge database with the detected text passage,
- a selection of one of the known text passages that shows the highest similarity to the detected text passage compared to the other known text passages,
- assigning the unique resource identifier of the selected known text passage to the detected text passage.

Hereby a quality of detecting the text passage based on known text passages stored in the knowledge database can be achieved.

In another embodiment of the invention, the storing of the detected text passage includes a storage of a reference information to the at least one report that is stored on a report database. Hereby storage space in the semantic annotation database can be reduced, because the reference information requires less storage space than the entire report or a part of the report.

In another embodiment of the invention, the first semantic annotation and the second semantic annotation are stored together at one place on the semantic annotation database. This will result in a boost of the available knowledge for the semantic search.

In another embodiment of the invention, the computing of at least one feature includes a generation of a low-level feature such as gradient or histogram features. Hereby a generation of classification of features can be provided in a low complex but very efficient way.

In an extension of the previous embodiment, the generating of the low-level feature includes a determination of a bounding box that defines a region of interest in the at least one image, whereby the region of interest represents an image area that is used to generate the at least one feature. By using the bounding box a location of a relevant feature can be described in a more precise way compared to the case when a reference relates to an entire image.

In another embodiment of the invention, the storing of the at least one computed feature includes a storage of
- a bounding box that defines a region of interest in the at least one image, whereby the region of interest represents an image area that is used to generate the at least one feature,
- a reference to the at least one image, whereby the at least one image is stored on a image database.

By using the bounding box, a location of a relevant feature can be described in a precise way compared to the case when a reference relates to an entire image. In addition by using the reference a storage space can be reduced as not the image itself by the sole reference has to be stored.

In another embodiment of the invention, the forming of the first query includes the use of at least a first part of textual information from the input query, whereby the first part of textual relates to a query of image information only. By this a specific textual query can be formed that allows retrieving a high quality result based on a content of the image.

In another embodiment of the invention, the forming of a second query includes the use of a reference image provided by the input query. Therewith the query on specific content of the images can be performed with visual information. This improves the result of the query, because a general textual description by be enhanced by the visual information.

In an enhancement of the previous embodiment, the forming of a second query excludes the use of textual information provided by the input query. Herewith a clear guideline is provided to describe the forming of the second query that will result in a high quality query result.

In another embodiment of the invention, a third query based on the input query is formed, whereby
- the third query includes patient information from at least one patient,
- the patient information is stored on a patient database,
- the patient information queried by the third query relates to the at least one image,
- a third result list is generated based on a result of the third query, whereby the third result list provides reference to the at least one image (IM) and/or to an image region of the at least one image (IM),
- the aggregating includes the aggregating of the first result list, the second result list and the third result list.

By this third query results of the first and second query can be limited to a lower number of hints. This improves the quality of the final result list by eliminating not relevant hits.

In another embodiment of the invention, the aggregating includes a ranking of the results of the first result list, the second result list and the third result list such that the final result list shows the results in an order of importance. By this embodiment the most relevant hits can be shown first. Hence a time to review the hits by a user can be reduced.

In another embodiment of the invention, the at least one image is a medical image. At least one embodiment of the invention can be used for medical images and associated medical reports in a very beneficial way.

At least one embodiment of the invention also relates to a device for data retrieval of a final result list, comprising:
- Analyzing at least one image stored on an image database to detect structures by an image parser unit;
- Mapping the detected structures by the image parser unit to unique resource identifiers coming from a knowledge database;
- Storing the detected structures and the unique resource identifiers as a first semantic annotation in a semantic annotation database by the image parser unit;
- Analyzing at least one report that is stored in a report database to identify a content of a text passage by a text parser unit;
- Mapping the detected text passage by the text parser unit to unique resource identifiers coming from the knowledge database;

Storing a begin and an end of the detected text passage and the unique resource identifiers as a second semantic annotation in the semantic annotation database by the text parser unit;

Analyzing at the least one image to compute at least one feature by a feature extractor unit;

Storing the at least one computed features and an index for fast retrieval in the image feature database by a indexing unit;

Proving an input query describing a search to be executed;

Forming a first query based on the input query and on additional anatomic information provided by the knowledge database by a query engine unit and a semantic inference unit;

Generating a first result list providing search results of the first query based on the semantic annotations by the semantic inference unit;

Forming a second query based on the input query and at least one computed feature based on the input query by the query engine unit and the indexing unit;

Generating a second result list providing search results of the second query based on the at least one stored computed feature by the indexing unit;

Aggregating the first result list and the second result list to form a final result list that provides reference to the at least one image and/or to an image region of the at least one image by the query engine unit.

The advantages of this device are equivalent to the advantages of the respective method steps above.

In an embodiment of the invention, the device is further capable to implement and execute at least one of the method steps as claimed in one of the previous embodiments. The advantages are the same as for the respective method embodiments.

An embodiment of the invention describes a content-based image retrieval method and device that use similarity search extended by a semantic model to increase the quality of the image search.

In a first example the following query shall be executed: "Find all patients with similar lesions in the liver and with thoracic lymph nodes enlarged"

The example is divided into two parts:
data preparation phase; and
data search/retrieval phase.

The first example is shown in FIG. 1 based on a device 100.

(i) Preparation Phase:

A data preparation unit 1 starts procession images and texts on receiving a notification event NE from a report database or an image data base. The notification event NE indicates that new data such as medical images or report texts arrived on the respective database. The report database 3 covers report texts and the image database (PACS) medical images.

For images IM the data preparation unit 1 invokes in step S1 an image parser unit 4 that loads in step S2 the new image and segments in step S3 the anatomy and pathological structures using software detectors, see e.g. [1] and [2]. The image parser unit 4 maps in step S4 detected structures to unique resource identifiers (URI) coming from a knowledge database 6 and stores this information as first semantic annotations SAINFO1 in step S5 in a semantic annotation database 7. By using the semantic annotations SAINFO1 it is possible both to reference to a certain image area in the image IM that shows the detected structure and to locate this certain image area by a unique resource identifier.

The mapping of the detected structures includes
a comparison of known structures of the knowledge database with the detected structure,
a selection of one of the known structures that shows the highest similarity to the detected structure compared to the other known structures,
assigning the unique resource identifier of the selected known structure to the detected structure.

Further on storing the detected structure includes a storage of a reference information to the at least one image that is stored on an image database. Additional a bounding box that defines a region of interest in the at least one image, whereby the region of interest represents an image area that covers the detected structure can be stored.

The data preparation unit 1 requests in step S6 from an indexing unit 8 to compute features by use of a feature extraction unit 5. The data preparation unit 1 requests in step S7 the image parser unit 4 to detect in step S8 specific image regions that are portions of the image IM, also called region of interest (ROI). For example in the case of lesions or pathological lymph nodes the image parser unit 4 detects the lesion or lymph node, computes a bounding box and passes this as ROI in steps S9 to the feature extractor unit 5. For details on how the image parser unit 4 is enabled to detect e.g. lymph nodes, see [3]. The feature extractor unit 5 computes in step S10 low-level features, e.g. gradient or histogram features from region of interest (ROI). Finally the features are stored in step S11 in an image feature database 9 and are indexed in step S12 for a fast retrieval.

The step of storing the at least one computed feature may include a storage of
a bounding box that defines a region of interest in the at least one image, whereby the region of interest represents an image area that is used to generate the at least one feature, and
a reference to the at least one image, whereby the at least one image is stored on a image database.

If new reports are available in the report database 3 a text parser unit 10 is in step S13 invoked by the data preparation unit 1 to parse in step S14 the next report text TEX for detecting a text passage PT and to generate second semantic annotations SAINFO2, i.e. mapping a unique resource identifier from the knowledge database 6 identifying a content of a text. In step S15 the text parser unit stores a begin TPB and an end TPE of the detected text passage PT of the new text TEX together with the URI in the semantic annotation database. The second semantic annotations SAINFO2 are stored in step S13 together with the first semantic annotations SAINFO1 generated by the image parser unit 4. This will result in a boost of the available knowledge for the semantic search. The data preparation unit 1 controls the text parser unit 10, the image parser unit 4 and the indexing unit 8. Both the text parser unit 10 and the image parser unit 4 use the knowledge database, e.g. ontology database, to find the correct URIs.

The step of mapping the detected text passage includes
a comparison of known text passages of the knowledge database with the detected text passage,
a selection of one of the known text passages that shows the highest similarity to the detected text passage compared to the other known text passages,
assigning the unique resource identifier of the selected known text passage to the detected text passage.

The storage of the detected text passage may include a storage of a reference information to the report, whereby the report may be stored in the report database.

(ii) Data Search/Retrieval Phase

Figure 2:
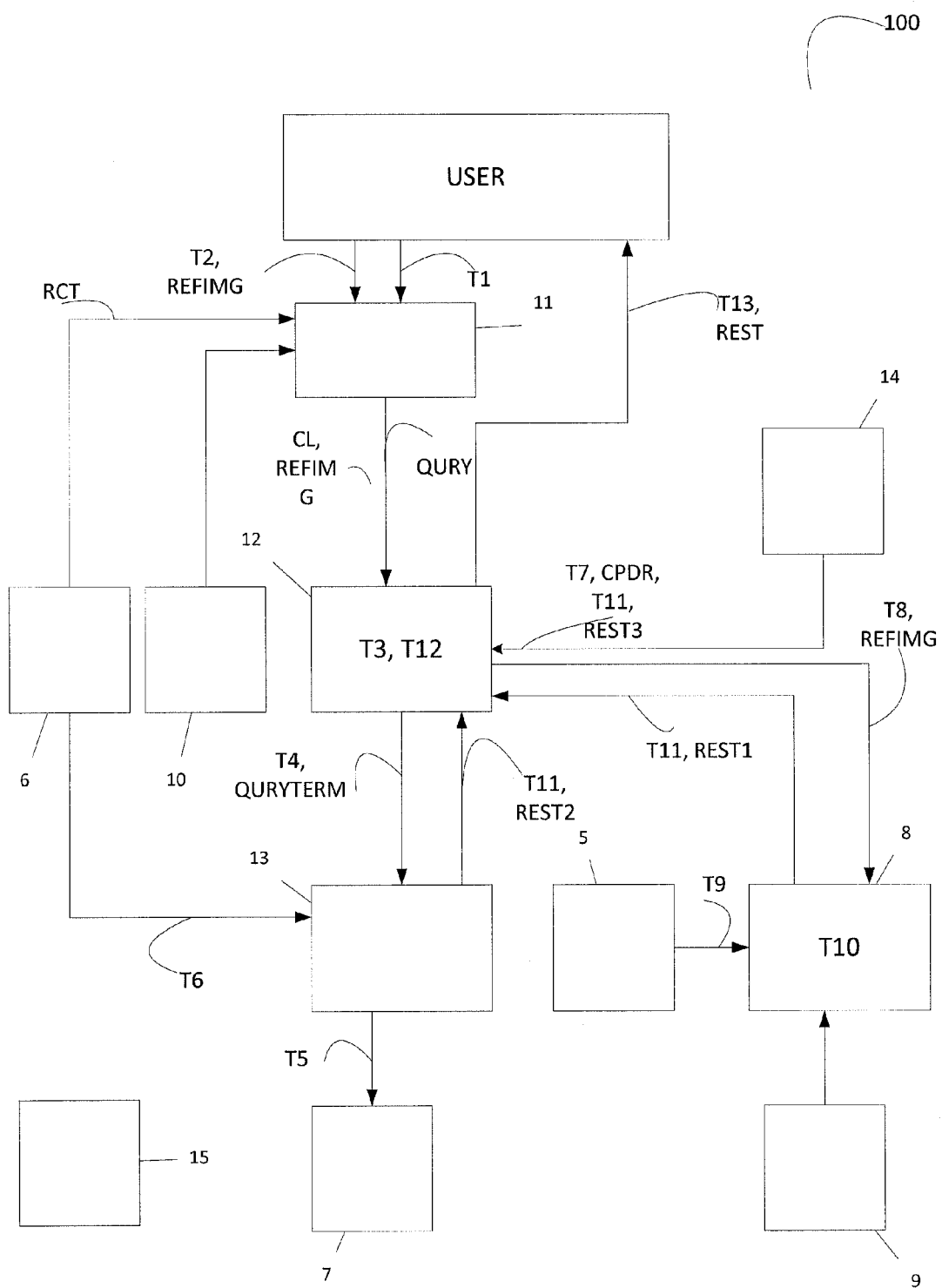
FIG. 2: Method steps and units of a device for realizing a data search/data retrieval phase.

After processing the new data such as reports and images and storing the meta-information as the semantic annotations SAINFO, SAINFO1 in the respective semantic database 7 and image feature database 9 the system can be used, e.g. by a user, to do an image retrieval. With reference to FIG. 2, in a step T1 a user can create a query QURY using a graphical user interface (GUI) 11. The GUI 11 provides a form to describe the query in two ways: directly using concepts RCT retrieved from the knowledge database 6 or making use of the text parser unit 10 to interpret free text.

Additionally the user can upload in a step T2 a reference image REFIMG that implicitly specifies the region of interest.

A query engine unit 12 accepts the input query QURY from the user, i.e. concept list CL and reference image REFIMG, and prepares in a step T3 queries for the individual subsystems. In the example of FIG. 2 these subsystems are the semantic inference unit 13, a patient database 14 and the indexing unit 8. In particular the indexing unit 8 takes care of the part of the query relating to the reference image, the semantic inference unit 13 takes care of parts of the query relating to textual queries about image content and the patient database 14 is contacted for parts of the query relating to non-image textual queries, such as gender or age of patients or laboratory values of patients, whereby images and or image regions of the images used for search can be filtered on such patient's information.

In step T4 the query engine unit 12 sends query terms QURYTERM, also called a first query, that are prepared in step T3 to a semantic inference unit 13. The semantic inference unit 13 queries in step T5 the semantic annotation database 7 with additional anatomic information retrieved from the knowledge database 6 in step T6. As an example, if the user searches for lymph nodes in the thorax the semantic inference unit 13 expands this query to specific names of the lymph nodes in the thorax such as pretracheal lymph node, hilar lymph node, axilliary lymph node and so forth.

Some constraints can be given by the user, e.g. age or gender, which the query engine unit 12 queries in step T7 in the patient database 14 to retrieve conventional patient data CPDR. The patient database 14 is usually a hospital information system (HIS) in hospitals. The patient database 14 covers laboratory values of patient general data.

The reference image REFIMG is sent in step T8 to the indexing unit 8 to be used for search in the image feature database 9. This represents a second query. The indexing unit 8 extracts in step T9 features of the reference image REFIMG by the use of the feature extractor unit 5 and searches in step T10 an index to find matching features in the image feature database 9. Information REST1, also known as a first result list, about belonging images and image regions are returned to the query engine unit in step T11.

Finally the query engine unit 12 takes in step T11 three result lists, the first results list REST1 from the indexing unit 8, a second result list REST 2 from the semantic inference unit 13 and a third result list RESTS from the patient database 14, aggregates them in step T12 and presents in step T13 the results of the aggregation REST such as reference to image and image regions back to the user. The result can be a ranked list matching images and image regions from different patients.

In addition the device 100 as described by the FIG. 1 and FIG. 2 may include for maintenance reasons a maintenance unit 15 to configure the units and database used for data preparation and data search phases.

The described method and device brings together two worlds:
- the semantic search in structured data (patient records) using background knowledge and
- the image similarity search comparing pixel intensities, given in a reference image.

Furthermore data necessary for the search is derived from the image and/or text automatically:
- the method and device automatically analyzes images and texts/reports with specific parsers, generates semantic annotations and stores them in the semantic annotation database;
- the method and device automatically extracts low-level features based on pixel values from images using knowledge derived from the generated semantic annotations and stores them in the image feature database.

In practice a report is generated for one or several images, such as in hospitals. Hence, when analyzing images and associates reports, the semantic annotations SAINFO1 and SAINFO2 relate to each other. Therefore it is beneficial to store both the first semantic annotation SAINFO1 and the second annotation SAINFO2 together in the semantic annotation database. This enhances the quality of information in the semantic annotation database.

Figure 3:
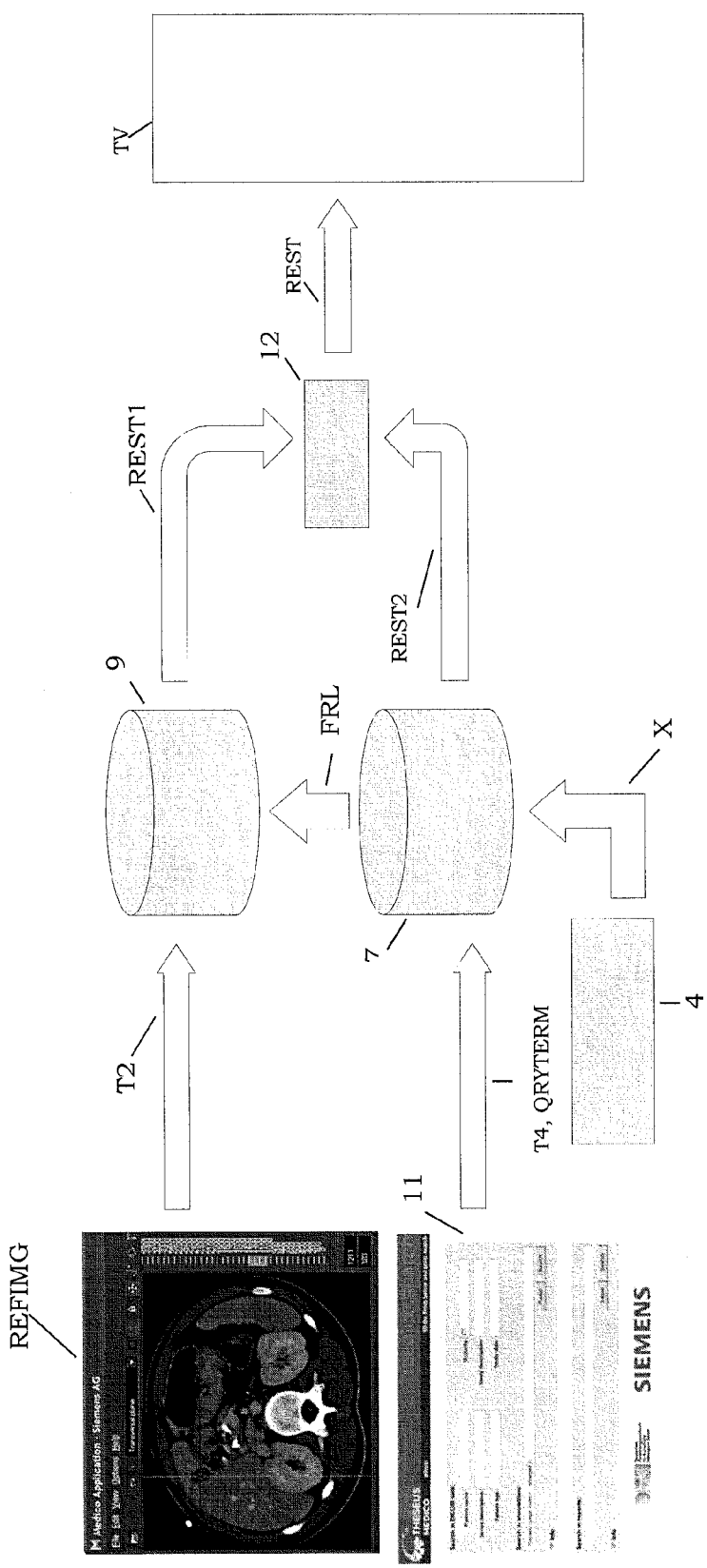
FIG. 3: A further example for executing the data preparation and search/retrieval phases.

In another example of the invention a workflow for the query example mentioned above is shown by a FIG. 3.

Figure 4:
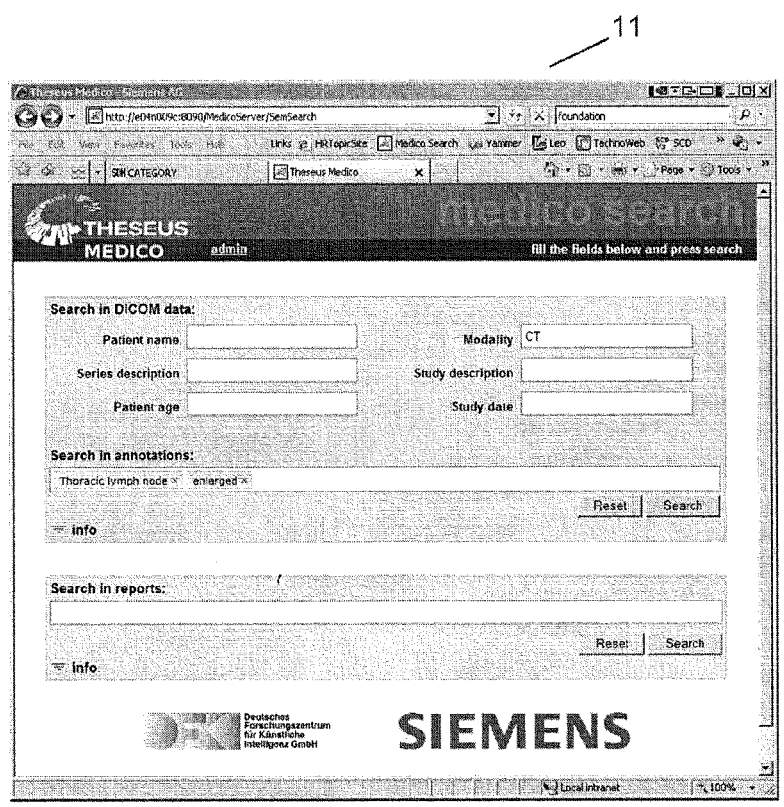
FIG. 4: Example of a query form to be used for initiating the data search phase.

The query is "Find all patients with similar lesions in the liver and with thoracic lymph nodes enlarged". A radiologist specifies a scribble, which is a GUI representation for a region of interest, e.g. in step T2 the query is set by scribble e.g. of the reference image REFIMG shown. FIG. 4 shows an enlarged view of the query interface, also called GUI of FIG. 3. Subsequently, the user fills the GUI based on a web-based form to limit the search to patients also showing enlarged thoracic lymph nodes. In the following the term system is used as a synonym for method or device.

Then the query is invoked and the system starts to distribute the query to the sub-systems.

For the query by the scribble, the system knows that the given lesion is within the liver; this information is derived from the automatically generated semantic annotations. The subsystem returns a ranked result list REST2, e.g. a ranked lesion list, to the query engine unit 12.

Analogously, the semantic search is processed, based on query terms QRYTERM, based on query by concept, and a ranked result list REST 2, e.g. a ranked concept list, is returned to the query engine.

Subsequently, both ranked results lists REST1, REST2 are merged and a final ranked result list REST is presented to the user. For convenience, this ranked list is hierarchically grouped by patients, e.g. on a screen TV for the user, such as Patient 1
Lesion 1
Lesion 2
. . .
Patient 2
Lesion 1
. . .
. . .
Patient k The image parser unit 4 provides annotated images, landmark and organ detection, as shown by reference sign X.

In addition a filtered rank list FRL can be provided from the subsystem (7) handling the semantic search to the subsystem (9) handling the query by the scribble.

The benefit for the physician is that he can be sure that only lesions from patients with additional enlarged (i.e. pathological) thoracic lymph nodes are returned. With this the physician can infer, that the given lesion is probably a tumor (since it occurred together with pathological lymph nodes).

Figure 5:
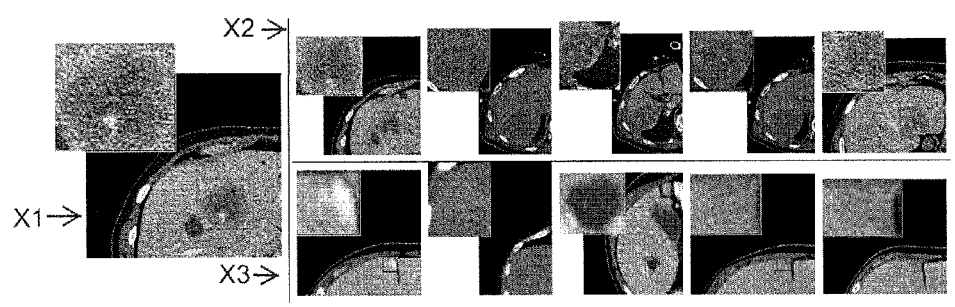
FIG. 5: Example of search results/retrieved data of medical images.

FIG. 5 shows an example of the final ranked result list REST. On the left of FIG. 5 a query lesion, e.g. as reference image REFIMG, is shown, whereby a region of interest in the reference image is scrabbled by dotted lines. On the right side of FIG. 5 a list of images returned from system showing similar lesions. The patient which shows the lesion also shows enlarged lymph nodes, i.e. he is in a progressed disease stage. In each image the ROI is marked with dotted lines and additional this ROI is shown in an enlarged form too. The reference sign X1 shows the query lesion, a reference sign X2 top 5 lesions and a reference sign X3 last 5 lesions.

The methods and devices may support the data preparation and/or search based on medical images.

The patent claims filed with the application are formulation proposals without prejudice for obtaining more extensive patent protection. The applicant reserves the right to claim even further combinations of features previously disclosed only in the description and/or drawings.

The example embodiment or each example embodiment should not be understood as a restriction of the invention. Rather, numerous variations and modifications are possible in the context of the present disclosure, in particular those variants and combinations which can be inferred by the person skilled in the art with regard to achieving the object for example by combination or modification of individual features or elements or method steps that are described in connection with the general or specific part of the description and are contained in the claims and/or the drawings, and, by way of combinable features, lead to a new subject matter or to new method steps or sequences of method steps, including insofar as they concern production, testing and operating methods.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program, tangible computer readable medium and tangible computer program product. For example, of the aforementioned methods may be embodied in the form of a system or device, including, but not limited to, any of the structure for performing the methodology illustrated in the drawings.

Even further, any of the aforementioned methods may be embodied in the form of a program. The program may be stored on a tangible computer readable medium and is adapted to perform any one of the aforementioned methods when run on a computer device (a device including a processor). Thus, the tangible storage medium or tangible computer readable medium, is adapted to store information and is adapted to interact with a data processing facility or computer device to execute the program of any of the above mentioned embodiments and/or to perform the method of any of the above mentioned embodiments.

The tangible computer readable medium or tangible storage medium may be a built-in medium installed inside a computer device main body or a removable tangible medium arranged so that it can be separated from the computer device main body. Examples of the built-in tangible medium include, but are not limited to, rewriteable non-volatile memories, such as ROMs and flash memories, and hard disks. Examples of the removable tangible medium include, but are not limited to, optical storage media such as CD-ROMs and DVDs; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

Bibliography

[1] S. Seifert, A. Barbu, K. Zhou, D. Liu, J. Feulner, M. Huber, M. Suchling, A. Cavallaro and D. Comaniciu: Hierarchical Parsing and Semantic Navigation of Full Body CT Data, SPIE 2009.

[2] Seifert, S.; Kelm, M.; Moeller, M.; Mukherjee, S.; Cavallaro, A.; Huber, M. & Comaniciu, D. (2010), Semantic Annotation of Medical Images, in 'SPIE 2010 Medical Imaging'.

[3] Feulner, J.; Zhou, S. K.; Huber, M.; Hornegger, J.; Comaniciu, D. & Cavallaro, A. (2010), Lymph Node Detection in 3-D Chest CT using a Spatial Prior Probability, in 'CVPR 2010: IEEE Conference on Computer Vision and Pattern Recognition'.

What is claimed is:

1. A method for data retrieval of a final result list, the method comprising:

generating a semantic annotation database that maps text from a report that describe at least one image to at least one unique resource identifier (URI) that identifies structures illustrated in the at least one image by, analyzing the at least one image to detect structures, mapping the detected structures to a first URI of the at least one URI associated with similar structures stored in a knowledge database, storing the detected structures and the first URI as a first semantic annotation in the semantic annotation database, analyzing the report to identify a content of a text passage,
mapping the identified content of the text passage to a second URI of the at least one URI to generate a mapped text passage, and
storing a begin and an end of the mapped text passage and the second URI as a second semantic annotation in the semantic annotation database such that the first semantic annotation and the second semantic annotation are stored together in the semantic annotation database,
generating an image feature database that stores features contained in the at least one image by,
detecting a region of interest (ROI) in the at least one image that includes the detected structures,
analyzing the ROI to compute at least one low-level feature therein, the at least one low-level feature being one of a gradient and histogram features of the ROI, and
storing the at least one level feature with a reference to the at least one image and an index for fast retrieval in the image feature database;
and
searching for a resulting set of images by comparing both features of a reference image received by a user with at least one feature in the image feature database and textual search terms input by the user and the semantic annotation database by,
receiving an input query describing a search to be executed, the input query containing both the reference image and the textual search terms input by the user,
forming a first query based on the textual search terms contained in the input query and on additional anatomic information provided by the knowledge database, the additional anatomic information being an expanded list of synonyms associated with the textual search terms,
generating a first result list providing search results of the first query based on the first semantic annotation and the second semantic annotation of the semantic annotation database,
forming a second query based on the reference image contained in the input query and on at least one computed feature based on the input query,
generating a second result list providing search results of the second query based on the at least one low-level feature in the image feature database, and
aggregating the first result list and the second result list to form a final result list that provides reference to at least one of the at least one image and an image region of the at least one of the at least one image.

2. The method as of claim 1, wherein the detection of structures in the at least one image includes segmenting anatomy and pathological structures.

3. The method as of claim 2, wherein the segmenting is performed by software detectors.

4. The method as of claim 1, wherein the mapping of the detected structures includes
comparing the known structures of the knowledge database with the detected structures,
selecting one of the known structures that shows a relatively highest similarity to the detected structures compared to the other known structures, and
assigning the first URI to the detected structures.

5. The method of claim 1, wherein the storing of the detected structures includes storing a reference information to the at least one image that is stored on an image database.

6. The method of claim 5, wherein the storing of the detected structures includes storing a bounding box that defines the region of interest in the at least one image, whereby the region of interest represents an image area that covers the detected structures.

7. The method of claim 1, wherein the mapping of the identified text passage includes
comparing known text passages of the knowledge database with the identified text passage,
selecting one of the known text passages that shows the highest similarity to the identified text passage compared to the other known text passages, and
assigning the unique resource identifier of the selected known text passage to the identified text passage.

8. The method of claim 1, wherein the storing of the identified text passage includes a storage of a reference information to the report that is stored in a report database.

9. The method of claim 1, wherein the first semantic annotation and the second semantic annotation are stored together at one place on the semantic annotation database.

10. The method of claim 1, wherein the computing of at least one feature includes a generation of a low-level feature such as gradient or histogram features.

11. The method of claim 10, wherein the generating of the low-level feature includes a determination of a bounding box that defines the region of interest in the at least one image, whereby the region of interest represents an image area that is used to generate the at least one feature.

12. The method of claim 1, wherein the storing of the at least one computed feature includes a storage of
a bounding box that defines the region of interest in the at least one image, whereby the region of interest represents an image area that is used to generate the at least one feature, and
a reference to the at least one image, whereby the at least one image is stored on an image database.

13. The method of claim 1, wherein the forming of the second query forms the second query without using the textual search terms contained in the input query.

14. The method of claim 1, further comprising:
forming a third query based on the input query, and wherein
the third query includes patient information from at least one patient,
the patient information is stored on a patient database,
the patient information queried by the third query relates to the at least one image,
a third result list is generated based on a result of the third query, whereby the third result list provides reference to at least one of the at least one image and an image region of the at least one image,
the aggregating includes the aggregating of the first result list, the second result list and the third result list.

15. The method of claim 14, wherein the aggregating includes a ranking of the results of the first result list, the second result list and the third result list such that the final result list shows the results in an order of importance.

16. The method of claim 1, wherein the at least one image is a medical image.

17. The method of claim 1, wherein the aggregating includes a ranking of the results of the first result list and the second result list such that the final result list shows the results in an order of importance.

18. A non-transitory computer readable medium including program segments for, when executed on a computer device, causing the computer device to implement the method of claim 1.

19. A device for data retrieval of a final result list, comprising:

a processor and a memory, the memory containing computer readable code that, when executed by the processor, configure the processor to, generate a semantic annotation database that maps text from a report that describe at least one image to at least one unique resource identifier (URI) that identifies structures illustrated in the at least one image by, analyzing the at least one image stored on an image database to detect structures, mapping the detected structures to the a first URI of the at least one URI associated with similar structures stored in a knowledge database, storing the detected structures and the first URI as a first semantic annotation in a semantic annotation database, analyzing the report stored in a report database to identify a content of a text passage, mapping the identified content of the text passage to a second URI of the at least one URI to generate a mapped text passage, and storing a begin and an end of the mapped text passage and the second URI as a second semantic annotation in the semantic annotation database such that the first semantic annotation and the second semantic annotation are stored together in the semantic annotation database;

generate an image feature database that stores features contained in the at least one image by, detecting a region of interest (ROI) in the at least one image that includes the detected structures, analyzing the ROI to compute at least one low-level feature therein, the at least one low-level feature of the ROI being one of a gradient and histogram features of the ROI, and storing the at least one low-level feature with a reference to the at least one image and an index for fast retrieval in the image feature database; and search for a resulting set of images by comparing both features of a reference image received by a user with at least one feature in the image feature database and textual search terms input by the user and the semantic annotation database by, forming a first query based on the textual search terms contained in an input query describing a search to be executed and on additional anatomic information provided by the knowledge database, the additional anatomic information being an expanded list of synonyms associated with the textual search terms, generating a first result list providing search results of the first query based on the first semantic annotation and the second semantic annotation of the semantic annotation database, forming a second query based on the reference image contained in the input query and at least one computed feature, generating a second result list providing search results of the second query based on the at least one low-level feature in the image feature database, and aggregating the first result list and the second result list to form a final result list that provides reference to at least one of the at least one image and an image region of the at least one of the at least one image.

20. The device as of claim 19, wherein the detection of structures in the at least one image includes segmenting anatomy and pathological structures.

* * * * *